Patented Jan. 6, 1942

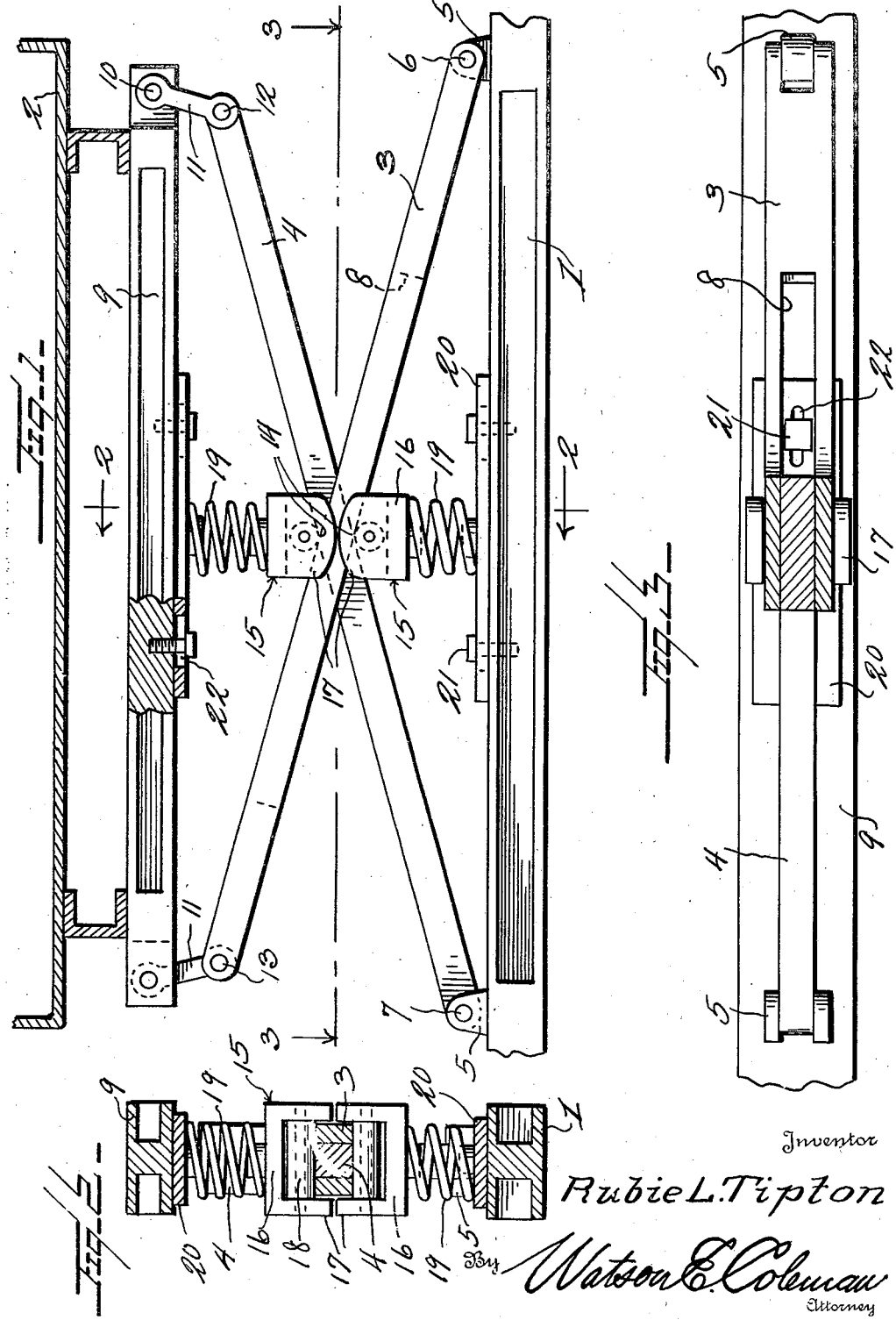

2,269,385

UNITED STATES PATENT OFFICE 2,269,385

LOAD EQUALIZING DEVICE

Rubie Lee Tipton, Bakersfield, Calif., assignor of twenty-five per cent to Raymond W. Henderson, and twenty-five per cent to Calvin E. Harbin, both of Bakersfield, Calif.

Application April 12, 1941, Serial No. 388,311

8 Claims. (Cl. 267—11)

This invention relates generally to the class of wheeled vehicles and pertains particularly to improvements in the suspension means for a vehicle body interposed between the body and the wheel supports therefor.

The primary object of the present invention is to provide a load equalizing means for mounting or supporting a vehicle body upon running gear, which means is of novel construction and is designed in such manner that the application of forces unequally to the vehicle body either by reason of the unequal distribution of a load thereon or by reason of the application of upward thrusts applied to the running gear, will be balanced in such manner that the vehicle body will be maintained level or upon an even keel at all times.

A further object of the invention is to provide an equalizing body mounting mechanism for interposition between a body and running gear, which is of simple design and, therefore, adapted to economical production and which is at the same time strong and efficient in operation.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in elevation of the equalizing mechanism of the present invention, the same being shown interposed between a vehicle body and a portion of the supporting running gear therefor.

Fig. 2 is a sectional view taken substantially on the line 2—2 of Fig. 1.

Fig. 3 is a horizontal section taken on the line 3—3 of Fig. 1.

Referring now more particularly to the drawing, the numeral 1 designates a portion of a vehicle supporting axle forming a part of the running gear for the vehicle while the numeral 2 designates a conventionally illustrated lower portion of a vehicle body disposed above the axle and supported from the axle by the equalizing mechanism constituting the present invention. Such equalizing mechanism will, as will be readily understood, be used between the vehicle body and both the front and rear axles therefor, but only one unit is here illustrated, as it will be readily apparent that the description of one will suffice.

In accordance with the present invention, the equalizing structure is supported upon the vehicle axle or other suitable supporting means through the medium of the two crossed levers 3 and 4. The axle or other lower supporting structure is provided with vertical coupling ears or shackles 5 with one of which the lever 3 is pivotally attached, as indicated at 6, while the other one has the lever 4 pivotally attached thereto, as indicated at 7. One of the levers, here shown as lever 3, is provided with the relatively long recess or slot 8 through which the other lever is slidably extended. Thus the levers are permitted up and down movement with respect to the underlying supporting structure and also with respect to the overlying structure which they support, the levers substantially functioning as a single unit lazy tong.

The upper part of the equalizer structure includes a horizontal beam 9 which extends transversely of the supported vehicle body 2 or other supported structure in spaced parallel relation with the axle 1, and each end of this beam 9 has pivotally attached thereto at 10, a depending or hanging link 11, one of which is pivotally attached, as at 12, to the bar 4 while the other one is pivotally attached, as at 13, to the bar 3.

With this arrangement of the levers 3 and 4, there are formed at the vertical center of the device when the same is not under strain, as it is shown in Fig. 1, the upwardly and downwardly directed crotches 14.

Resting upon the tops of the levers 3 and 4 in the upper crotch 14 is a bearing unit 15 and a similar bearing unit is disposed upon the under sides of the levers to engage in the downwardly opening crotch, as shown. Each of these bearing units comprises a body 16 having vertical side flanges 17 which engage over the opposite sides of the wider one of the levers 3, as shown in Fig 2, whereby to prevent the bearing units from shifting out of engagement with the levers. In order to facilitate the lateral movement of each bearing unit 15, a roller 18 may be disposed between the side flanges 17 or any other suitable means may be provided to furnish a contact surface between the bearing unit and the two angularly related faces of the levers which it opposes.

Interposed between each bearing unit body 16 and the opposing horizontal element of the equalizer such as the beam 9 for the upper unit 15 and the axle 1 for the lower unit 15, is an expansion spring 19. Each of these springs is coupled with the opposing horizontal body in a manner to facilitate sliding movement of the spring longitudinally of the opposing body and as is shown in Fig. 1, the opposing body 9 for the upper spring 19 and the opposing body 1 for the lower spring has in connection therewith a plate 20 against which the adjacent spring bears, which plate is joined by stud bolts 21 extending through longitudinal slots 22, to the adjacent body so that the plate may readily shift lengthwise of the body. It will, of course, be understood that any other means may be employed for joining the springs with the horizontal opposing bodies which will satisfactorily permit the springs to shift or slide lengthwise of the bodies when the equalizer is in operation.

From the foregoing, it will be readily understood that when the body 2 is unbalanced as by the application of a load thereon which is not evenly distributed or when upon rapid movement of the vehicle along a curved path the body tends to tilt or when any upward thrust is applied to one end of the vehicle axle with greater force than to the other end, the springs 19 will tend to shift their positions from the longitudinal center of the vehicle and from the vertical center of the equalizer toward the side of the vehicle where the unequal force is the greatest so as to oppose such unequal application of force and thereby tend to maintain or hold the body of the vehicle horizontal.

While two springs have been shown one disposed above the horizontal center of the equalizer and the other below such center, the device may be operated efficiently by the use of one spring only, if desired.

What is claimed is:

1. An equalizing body supporting structure, comprising a pair of relatively long crossed lever members, the levers being free of connection one with the other, means forming a fixed horizontal pivot for a lower end of each lever member, a body disposed horizontally above said lever members, a pivotal connection between the upper end of each lever member and said horizontal body, and a vertically disposed spring interposed between said horizontal body and the crossed lever members and supported from the lever members in the angle formed therebetween.

2. An equalizing support for a body, comprising a pair of relatively long levers arranged in crossed relation in a vertical plane, said levers being free of connection one with the other and forming upwardly and downwardly directed crotches, a fixed pivot for the lower end of each of said members, a horizontal body extending in the plane of said members above the same, a loose coupling between the upper end of each of said lever members and an end of said horizontal body permitting relative lateral movement of the horizontal body with respect to the upper ends of the levers, and a spring disposed vertically between said body and the upper one of said crotches and constantly maintaining a pressure against said levers between the same and the body.

3. An equalizing device of the character described, comprising a pair of spaced parallel bodies, a pair of relatively long levers arranged in crossed relation between said bodies, said levers being free of connection with one another, pivotal coupling means between the one end of each of said levers and one of the bodies, a pivotal coupling means between the other end of each lever and the other body, and an expansion spring interposed between one of said bodies and the two levers and exerting contact pressure upon the levers in the angle formed between the same.

4. An equalizing device of the character described, comprising a pair of spaced parallel bodies, a pair of relatively long levers arranged in crossed relation between said bodies, said levers being free of connection with one another, pivotal coupling means between one end of each of said levers and one of the bodies, a pivotal coupling means between the other end of each lever and the other body, and an expansion spring interposed between one of said bodies and the two levers and exerting constant pressure upon the levers in the angle formed between the same, said spring being connected with the adjacent body and with the levers to have movement longitudinally of and between the levers and the adjacent body.

5. An equalizer structure of the character described, comprising a pair of vertically spaced parallel bodies, a pair of relatively long levers arranged in crossed relation between said body, said levers being free of pivotal connection one with the other, a pivotal connection between the lower end of each lever and the lower body, a link member pivotally connected with each end of the upper body and having pivotal connection with the upper end of a lever, said pivotal connections for the links and for the levers being on axes extending transversely of the bodies, and an expansion spring interposed between one of the bodies and the levers to exert pressure against the levers in the angle formed therebetween.

6. An equalizer structure of the character described, comprising a pair of vertically spaced parallel bodies, a pair of relatively long levers arranged in crossed relation between said body, said levers being free of pivotal connection one with the other, a pivotal connection between the lower end of each lever and the lower body, a link member pivotally connected with each end of the upper body and having pivotal connection with the upper end of a lever, said pivotal connections for the links and for the levers being on axes extending transversely of the bodies, an expansion spring interposed between one of the bodies and the levers to exert pressure against the levers in the angle formed therebetween, means joining one end of the spring with the adjacent body whereby movement of the spring lengthwise of the body is facilitated, and means joining the other end of the spring with the levers whereby movement of the spring lengthwise of the levers is facilitated.

7. An equalizer structure of the character described, comprising a pair of vertically spaced parallel bodies, a pair of relatively long levers arranged in crossed relation between said body, said levers being free of pivotal connection one with the other, a pivotal connection between the lower end of each lever and the lower body, a link member pivotally connected with each end of the upper body and having pivotal connection with the upper end of a lever, said pivotal connections for the links and for the levers being on axes extending transversely of the bodies, a bearing member engaging said levers in an angle formed between the same, said bearing member having spaced flanges between which the levers are disposed whereby movement of the bearing member lengthwise of the levers only is permitted, and an expansion spring interposed between the bearing member and the adjacent body and connected with said adjacent body for movement lengthwise thereof.

8. An equalizer structure of the character described, comprising a pair of vertically spaced parallel bodies, a pair of relatively long levers arranged in crossed relation between said body, said levers being free of pivotal connection one with the other, a pivotal connection between the lower end of each lever and the lower body, a link member pivotally connected with each end of the upper body and having pivotal connection with the upper end of a lever, said pivotal connections for the links and for the levers being on axes extending transversely of the bodies, said crossed lever members providing upwardly and downwardly directed crotches, a bearing member engaging in each of said crotches, each bearing member having side flanges between which the levers are slidably retained whereby the bearing members may have movement longitudinally only of the levers, and an expansion spring interposed between each bearing member and the adjacent body and having slidable connection with the adjacent body for movement longitudinally thereof.

RUBIE LEE TIPTON.